US012723715B2

(12) United States Patent
Saha et al.

(10) Patent No.: US 12,723,715 B2
(45) Date of Patent: Sep. 1, 2026

(54) HYDROGEN FUEL STORAGE AND DELIVERY METHOD TO POWER AIRCRAFT

(71) Applicant: Green Grid Inc., San Ramon, CA (US)

(72) Inventors: Chinmoy Prosun Saha, San Ramon, CA (US); Jeffrey Scott Pickles, Sunnyvale, CA (US)

(73) Assignee: Green Grid, Inc., San Ramon, CA (US)

( * ) Notice: Subject to any disclaimer, the term of this patent is extended or adjusted under 35 U.S.C. 154(b) by 0 days.

(21) Appl. No.: 18/934,318

(22) Filed: Nov. 1, 2024

(65) Prior Publication Data

US 2025/0060074 A1 Feb. 20, 2025

Related U.S. Application Data

(62) Division of application No. 18/243,733, filed on Sep. 8, 2023, now Pat. No. 12,173,853, which is a division (Continued)

(51) Int. Cl.

| | |
|---|---|
| ***F17C 5/00*** | (2006.01) |
| ***F17C 5/02*** | (2006.01) |
| ***F17C 13/02*** | (2006.01) |

(52) U.S. Cl.

CPC ................ *F17C 5/007* (2013.01); *F17C 5/02* (2013.01); *F17C 13/025* (2013.01);

(Continued)

(58) Field of Classification Search

CPC .......... F17C 5/007; F17C 5/02; F17C 13/025; F17C 13/026; F17C 2205/0332;

(Continued)

(56) References Cited

U.S. PATENT DOCUMENTS

| | | | |
|---|---|---|---|
| 4,883,099 | A | 11/1989 | Vanommeren |
| 6,152,196 | A | 11/2000 | Kehoe |

(Continued)

FOREIGN PATENT DOCUMENTS

| | | | | |
|---|---|---|---|---|
| EP | 3228546 | B1 * | 5/2022 | .............. B64F 1/352 |
| WO | 2013086345 | A1 | 6/2013 | |

OTHER PUBLICATIONS

Photo of Insulating Jacket on a Single High Pressure Vessel, Lawrence Livermore National Laboratory (published prior to Nov. 2020).

(Continued)

*Primary Examiner* — Christopher M Afful

(74) *Attorney, Agent, or Firm* — Harness, Dickey & Pierce, P.L.C.

(57) ABSTRACT

A fuel delivery and storage method is provided. A further aspect employs a remote central controller and/or software instructions which receive sensor data from stationary and bulk fuel storage tanks, portable distribution tanks, and end use tanks. Another aspect of the present system senses and transmits tank or hydrogen fuel characteristics including temperature, pressure, filled volume, contaminants, refilling cycle life and environmental hazards. Still another aspect includes a group of hydrogen fuel tanks which is pre-assembled with sensor, valve, microprocessor and transmitter components, at least some of which are within an insulator.

33 Claims, 10 Drawing Sheets

Related U.S. Application Data of application No. 17/109,722, filed on Dec. 2, 2020, now Pat. No. 11,796,132.

(52) U.S. Cl.
CPC .... *F17C 13/026* (2013.01); *F17C 2205/0332* (2013.01); *F17C 2221/012* (2013.01); *F17C 2250/032* (2013.01); *F17C 2250/0408* (2013.01); *F17C 2250/043* (2013.01); *F17C 2250/0439* (2013.01); *F17C 2250/0447* (2013.01); *F17C 2270/0102* (2013.01); *F17C 2270/0142* (2013.01); *F17C 2270/0173* (2013.01); *F17C 2270/0186* (2013.01)

(58) Field of Classification Search
CPC .......... F17C 2221/012; F17C 2250/032; F17C 2250/0408; F17C 2250/043; F17C 2250/0439; F17C 2250/0447; F17C 2270/0102; F17C 2270/0142; F17C 2270/0173; F17C 2270/0186
USPC .............................................................. 141/1
See application file for complete search history.

(56) References Cited

U.S. PATENT DOCUMENTS 6,619,336 B2 9/2003 Cohen et al.
6,786,245 B1 * 9/2004 Eichelberger ............. F17C 5/06 141/2
6,983,611 B2 1/2006 Reese et al.
7,178,565 B2 2/2007 Eichelberger et al.
7,568,507 B2 8/2009 Farese et al.
10,046,962 B2 8/2018 Hall et al.
10,082,246 B2 9/2018 Aceves et al.
11,796,132 B2 10/2023 Saha et al.
12,173,853 B2 12/2024 Saha et al.
2003/0233206 A1 * 12/2003 White ....................... F17C 7/00 702/116
2005/0000802 A1 1/2005 Hobbs
2005/0132745 A1 6/2005 Haberbusch
2005/0193989 A1 * 9/2005 Veenstra ................. F17C 5/007 123/527
2009/0199574 A1 8/2009 Hirose et al.
2010/0023162 A1 * 1/2010 Gresak ................. G06Q 10/087 705/28
2010/0025523 A1 2/2010 Kutzmann et al.
2013/0213521 A1 8/2013 Isom et al.
2014/0034162 A1 2/2014 Mackey
2014/0174588 A1 * 6/2014 Yim ........................ F17C 5/007 141/83
2015/0336680 A1 11/2015 Schumacher et al.
2016/0137293 A1 5/2016 Santangelo
2017/0032315 A1 2/2017 Gupta et al.
2017/0154301 A1 6/2017 Stevenson et al.
2017/0327091 A1 11/2017 Capizzo
2017/0341769 A1 * 11/2017 Haberbusch ............ F17C 5/007
2018/0098137 A1 4/2018 Saha et al.
2019/0130423 A1 5/2019 Watanabe et al.
2019/0135125 A1 5/2019 Sponheimer et al.
2019/0322362 A1 10/2019 Santangelo et al.
2020/0276909 A1 9/2020 Boisen et al.
2020/0335806 A1 10/2020 Zheng et al.
2021/0245719 A1 * 8/2021 Hall ..................... G07C 5/0808

OTHER PUBLICATIONS

Illustration of Linde Cryo-cooled LH2 Tank (published prior to Nov. 2020).
Plasteel Elutron Doublewall Underground Fuel Storage Tanks Brochure (Nov. 23, 2020).
San Francisco Maritime National Park Association, "Boilers Engineering Branch Training, Part 2" (2013).
Technical Assessment Cryo-Compressed Hydrogen Storage, Dept. of Energy Hydrogen Program (Oct. 30, 2006).
Wikipedia, Definition: Hydrogen Storage (Nov. 19, 2020).
Linde Cryogenic Standard Tanks Lits 2 (Nov. 24, 2020).
Society of Automotive Engineers Surface Vehicle Standard J2601TM (SAE J2601), titled "Fueling Protocols for Light Duty Gaseous Hydrogen Surface Vehicles" (2014).

* cited by examiner

HYDROGEN FUEL STORAGE AND DELIVERY METHOD TO POWER AIRCRAFT

CROSS-REFERENCE TO RELATED APPLICATIONS

The present application is a divisional of U.S. patent application Ser. No. 18/243,733, filed on Sep. 8, 2023, which is a divisional of U.S. patent application Ser. No. 17/109,722, filed on Dec. 2, 2020, now issued as U.S. Pat. No. 11,796,132, both of which are incorporated by reference herein.

BACKGROUND AND SUMMARY

The present application generally pertains to fuel storage and delivery, and more particularly to a hydrogen fuel storage and delivery system.

It is known to use temperature and pressure sensors to monitor a pressurized gas source by an electronic controller for refueling vehicle storage tanks with compressed hydrogen and compressed natural gas. Such a traditional system is discussed in U.S. Pat. No. 6,619,336 entitled "System and Method for Dispensing Pressurized Gas," which issued to Cohen et al. on Sep. 16, 2003, and is incorporated by reference herein. Furthermore, a towable trailer-based mobile fueling station automatically delivers pressurized hydrogen to a vehicle based on communications with a monitoring facility, is set forth in U.S. Pat. No. 6,786,245 entitled "Self-Contained Mobile Fueling Station," which issued to Eichelberger et al. on Sep. 7, 2004, and is incorporated by reference herein. A communications network for refueling vehicles from a mobile fuel station is disclosed in U.S. Pat. No. 10,046,962 entitled "Mobile Vehicle Refueling System," which issued to Hall et al. on Aug. 14, 2018, and is incorporated by reference herein. These conventional approaches, however, only consider a small portion and micro-view of the overall fuel storage and delivery system. Moreover, these prior attempts do not employ predictive analytics and automated management for overall hydrogen fuel storage and delivery on a macro-level.

In accordance with the present invention, a fuel delivery and storage system is provided. A further aspect employs a remote central controller and/or software instructions which receive sensor data from stationary and bulk fuel storage tanks, portable distribution tanks, and end use tanks. Another aspect of the present system senses and transmits tank or hydrogen fuel characteristics including temperature, pressure, filled volume, contaminants, refilling cycle life and environmental hazards. Still another aspect includes autonomous aircraft, watercraft, rail and/or land vehicle distribution of fuel. In a further aspect, a group of hydrogen fuel tanks is pre-assembled with sensor, valve, microprocessor and transmitter components, at least some of which are within an insulator. Yet another aspect provides methods of automatically predicting new fuel distribution depo sites and/or automatically distributing hydrogen fuel.

The present system is advantageous over conventional devices. For example, the present system automatically senses and monitors real-time tank and/or fuel characteristics at one or more remote control centers which advantageously improves filling safety, storage safety, maintenance, refilling timeliness, and distribution and logistics efficiencies. Moreover, the present system beneficially models, maps and predicts new or revised distribution depot sites, autonomous distribution vehicle placement, bulk storage tanks, distribution tanks and end use tanks. Fuel storage tanks may be stockpiled a regional depots and then automatically distributed based on automatically sensed use, population growth, power outage and/or emergency predictions or actual need. The present system is also advantageous by uniquely pre-assembling and packaging multiple hydrogen storage tanks in a smaller space, with lower part costs, for remote monitoring and control, and with improved fuel temperature control. The pre-assembled groups of tanks and "smart" tanks with sensors, processors and transmitters attached thereto allow for automated sensing and control of the tank and the fuel therein. Moreover, the insulator arrangement of the present system can be beneficially used in a vacuum jacket configuration around a cryogenically cooled tank to store more dense fuel. The present system is also well suited for use with stationary and/or below-ground hydrogen storage tanks with integrated sensors. Additional advantageous and features of the present system will become apparent from the following description and appended claims, taken in conjunction with the accompanying drawings.

DETAILED DESCRIPTION

Figure 1:
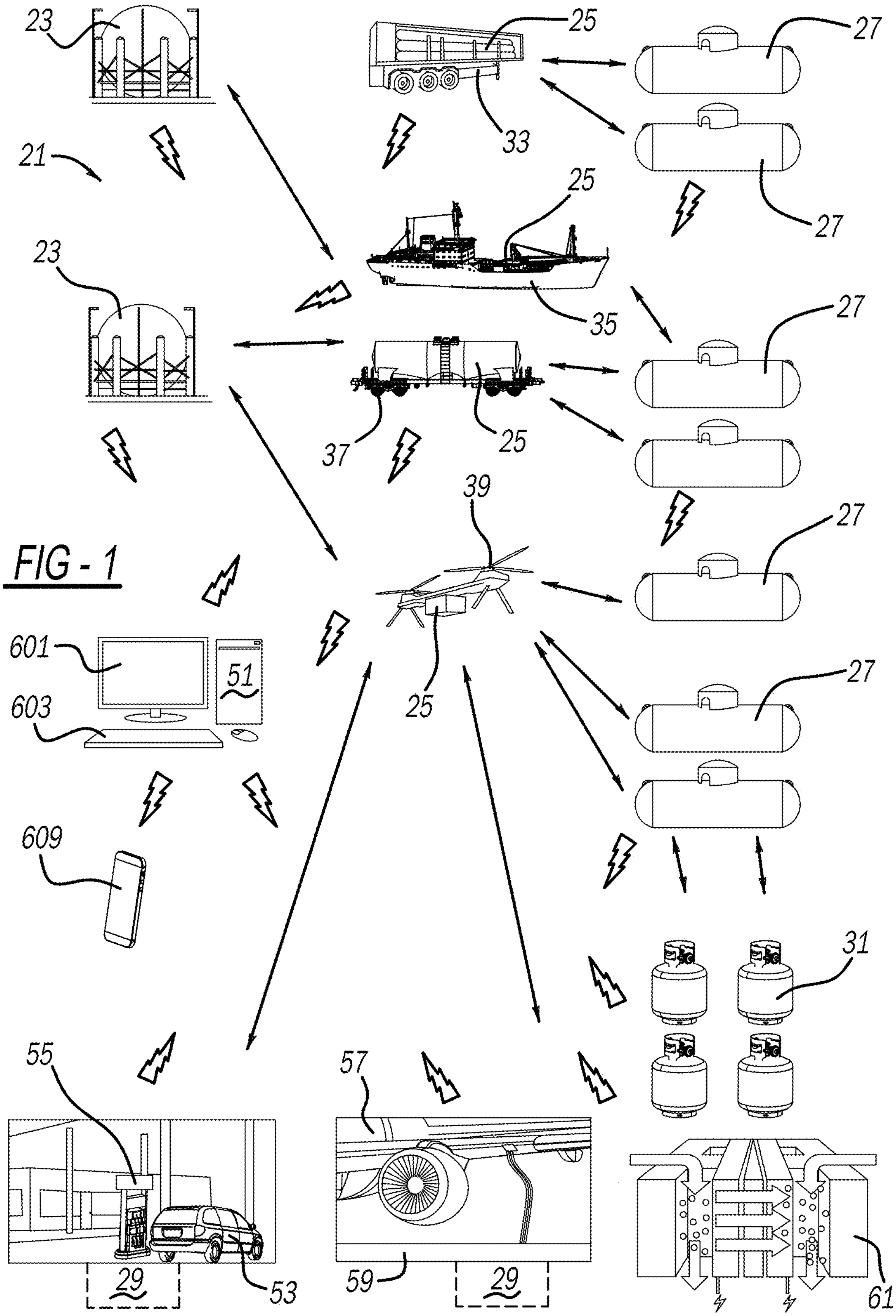
FIG. 1 is a diagrammatic view showing the present fuel storage and delivery system.

A preferred embodiment of a hydrogen fuel storage and delivery system 21 is shown in FIG. 1. System 21 includes stationary bulk storage tanks 23, distribution tanks 25 and 27, stationary end use tanks 29, and portable end use tanks 31. Some of the distribution tanks 25 are mounted on automotive land vehicles 33, such as a wheeled truck trailer, watercraft vehicles 35, such as a surface ship or submarine, train rail car vehicles 37, and unmanned aircraft vehicles ("UAV") 39. Optionally, any of these vehicles may be automatically and autonomously controlled and driven responding to output signals from a central controller 51.

Stationary end use storage tanks 29 can be located below-ground for supplying fuel to user automotive vehicles 53 at a retail fueling station 55, to a user aircraft 57 at an airport 59, or the like. The underground storage tanks 29 are preferably buried within dirt, with an accessible manhole cover at the ground surface level, and a fill pipe and electronic components such as sensors, microprocessors, communications transmitters/receivers, and valve actuators, are locally coupled to the tank as will be described in greater detail hereinafter. Tanks 29 are preferably steel with a corrosion inhibitor coating, such as epoxy with a zinc primer, elastomeric urethane or CIM tar.

Furthermore, stationary or portable end use storage tanks 29 and 31, respectively, may be located aboveground to supply fuel to a stationary or portable, electro-chemical fuel cell 61 for generating electricity on a back-up or full-time basis to a manufacturing plant, office building, residential building, construction site, hospital, vehicle or other temporary or permanent uses. Regional depots are geographically located at locations adjacent to and more commonly, remote from bulk storage tanks 23. Some of distribution vehicles 33-39 and portable distribution storage tanks 25 carried thereon, are stockpiled or temporarily located at these regional depots waiting to be automatically dispatched and driven to be refilled from one or more of bulk storage tanks 23, or to subsequently refill downstream intermediate sized distribution storage tanks 27 or end use storage tanks 27 and 29.

Figure 2:
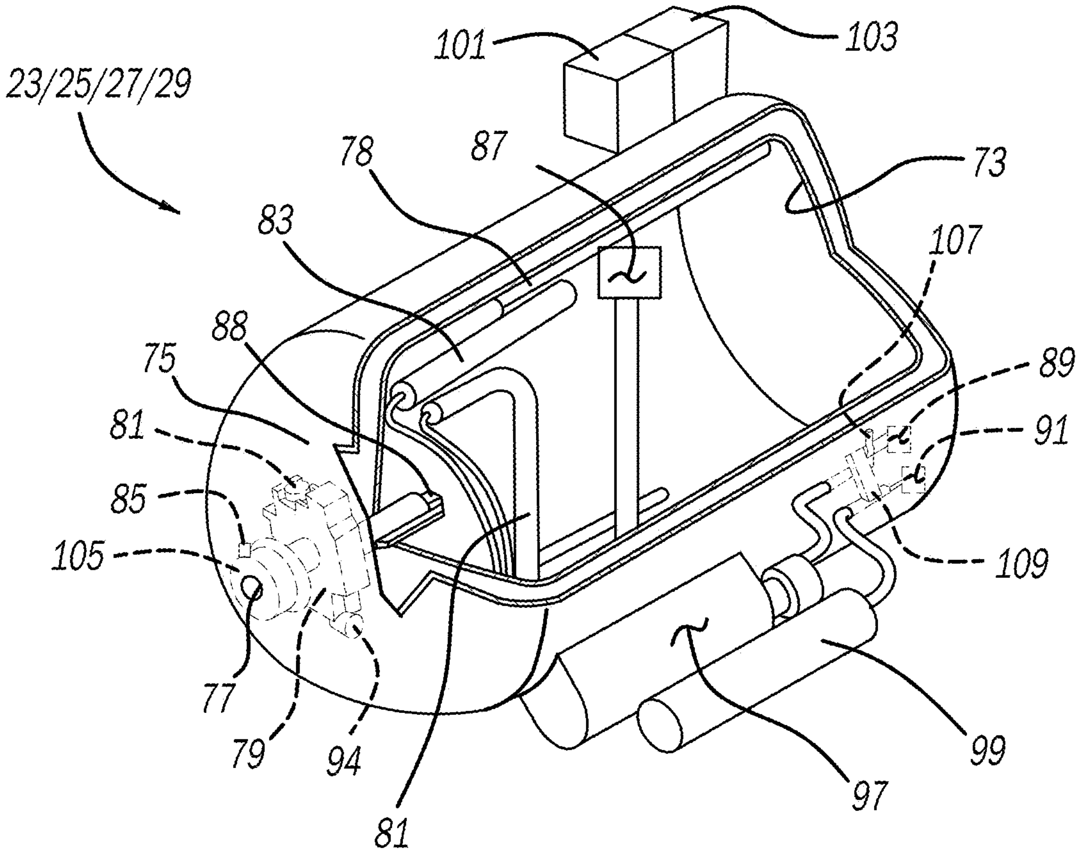
FIG. 2 is fragmentary and perspective view showing a fuel storage tank of the present system.
Figure 9:
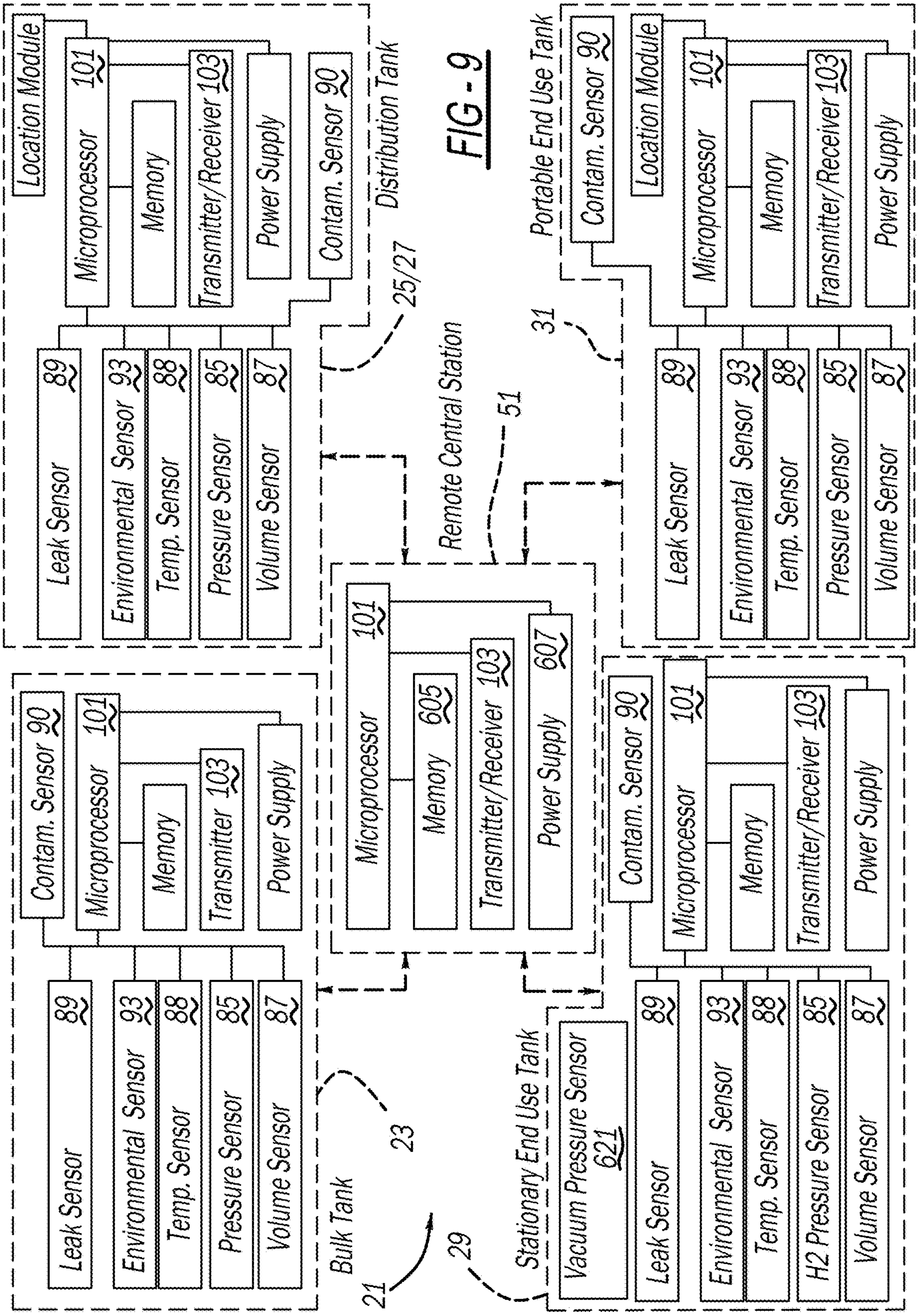
FIG. 9 is a diagrammatic view showing an electrical sensing and control circuit of the present system.

Referring to FIGS. 2 and 9, the bulk, distribution and/or end use storage tanks can optionally be cryogenically cooled to liquefy and densify the hydrogen fuel stored therein or keep the liquefied gas in liquid state by compensating for the heat gain from the environment. One configuration of tank 23/25/27/29 includes fuel-holding vessel 73 and an insulator vacuum jacket 75.

A filling inlet port 77 and fill pipe 78 enters the vessels via a manifold 79 which contains internal fluid passageways, and electrical feedthrough. A main shut-off valve, remotely controllable by an electromagnetically movable solenoid actuator 81, is also connected to manifold 79. The solenoid actuator employs a linearly or rotatably movable armature calibrated as a variable flow control orifice. It is optionally connected to a differential pressure sensor to automatically measure and report a pressure drop across the valve orifice for automatic comparison to a calculated or desired fuel flow rate, temperature and pressure, for further automatic valve position control by a local or remote controller. Alternately, a pneumatic actuator can be used to change a flow condition (e.g., on/off or partial closure) of the shut-off or other valves. The shut-off and other valves disclosed herein are preferably needle type valves but may alternately be poppet, ball or gate valves.

A liquid extraction pipe 81 and a gas extraction pipe 83 are also located in the tank. Moreover, a fuel filling flow or pressure sensor 85 is coupled to inlet port 77, a fuel volume level sensor 87 and fuel temperature sensor 88 are located inside inner vessel 73, a fuel leak sensor 89 is mounted to an outlet port, and an environmental sensor 93 is mounted to an exterior of the surrounding insulator jacket. Environmental sensor 93 senses external heat, whether from sunlight, end user or distribution vehicle exhaust, wild fires, or adjacent flames. A pressure relief valve 94 is also coupled to manifold 79.

Additionally, an optional electrical heater 95 is internally located within inner vessel 73, a cryogenically cooling system is externally mounted to outer vessel 71, which includes a reversing gas-to-liquid valve 97 and a cooling water heat exchanger 99. The liquid hydrogen fuel is cooled inside the inner vessel to about −253° C. and pressurized within a range about 200 to 10,000 psi. A microprocessor controller 101 and wireless communications transmitter/receiver 103 are mounted to the exterior of vacuum jacket 75 and electrically connected to sensors 85, 87, 89 and 91. Microprocessor 101 may optionally, also be connected to control opening and closing operation of an inlet shut-off valve 105, an outlet shut-off valve 107 and a cryogenic cooling shut-off valve 109 in order to automatically regulate fuel pressure, quantity, filling and temperature characteristics at a local sensing and control level and/or based on sensed signals sent to and control signals received from central controller 51 (see FIG. 1).

Insulator vacuum jacket 75 surrounds vessel 73, manifold 79, valves 105, 107 and 109, and sensors 85, 89 and 91. An air gap is present between the jacket and the vessel and its fuel carrying plumbing components. Cooling components 97 and 99 are external to the vacuum jacket but optionally preassembled to the tank's mounting base. It is noteworthy that the hydrogen, such as within a valve body or pipe, is not in direct or indirect contact with the outside environment external to the insulating vacuum jacket.

Figure 3:
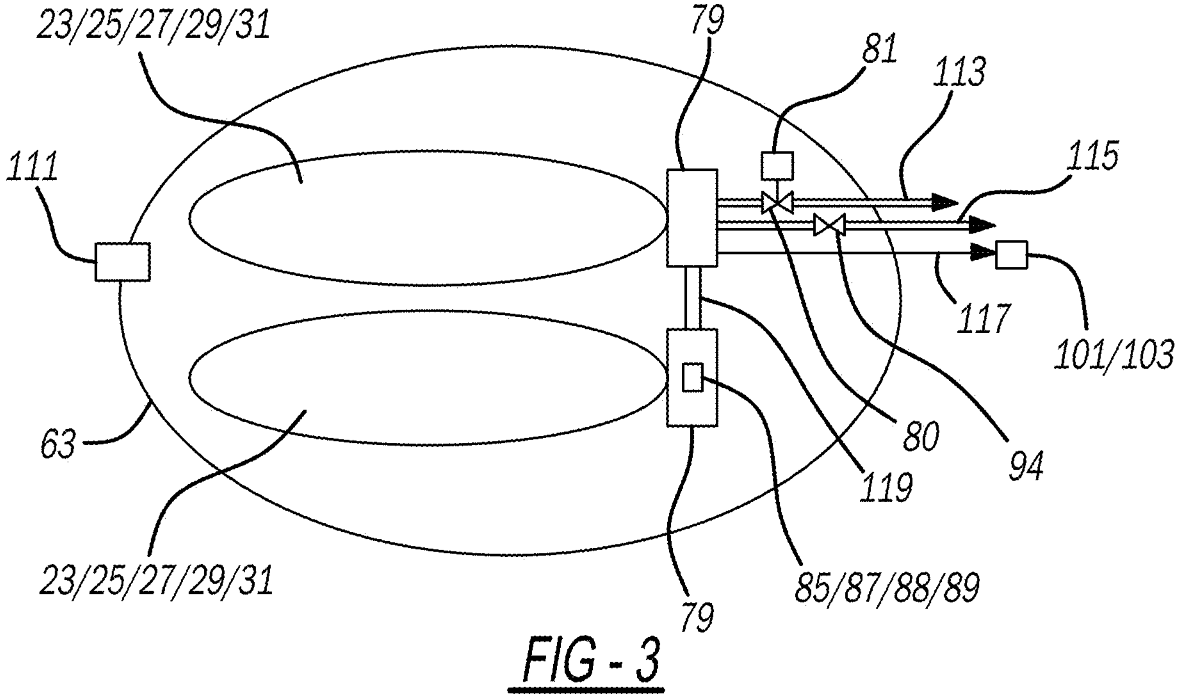
FIG. 3 is a diagrammatic view showing another configuration of a preassembled fuel storage tank group of the present system.

FIG. 3 illustrates another configuration of cryogenically cooled bulk, distribution and/or end use storage tanks which store liquid hydrogen fuel therein. This configuration of tank assembly employs multiple grouped tanks 23/25/27/29 within a single vacuum insulator jacket 63. Insulator jacket surrounds all of the tanks within the preassembled group and also surrounds and encases manifolds 79, shut-off valve 80 and tank/fuel sensors 85/87/88/89 therein. A vacuum port 111 is disposed in a side of insulator jacket 63 to allow for the pulling of vacuum pressure after component preassembly. A main fill and supply pipe 113 and a pressure relief pipe 115 are coupled to at least one of manifolds 79. An electrical wire 117 and/or fiber optical cable connect the solenoid actuators and sensors from the tanks to externally mounted microprocessor 101 and communications transmitter/receiver 103. Furthermore, an internal pipe 119 couples between manifolds 79 of adjacent tanks, such that single shut-off or regulator valve 80 and its solenoid actuator 81 can optionally control incoming and outgoing hydrogen fuel flow into and out of the entire preassembled group of tanks.

A cryogenic coupling, a heat exchanger and valve are in a fluid flow circuit to one or more of the tanks, as is shown in FIG. 2. Exemplary cryogenic cooling components can be found in U.S. Pat. No. 6,983,611 entitled "Storage Container for Cryogenic Media" which issued to Reese et al. on Jan. 10, 2006, and U.S. Pat. No. 10,082,246 entitled "Cryogenic Pressurized Storage with Hump-Reinforced Vacuum Jacket" which issued to Aceves et al. on Sep. 25, 2018. Both of these patents are incorporated by reference herein.

Figure 4:
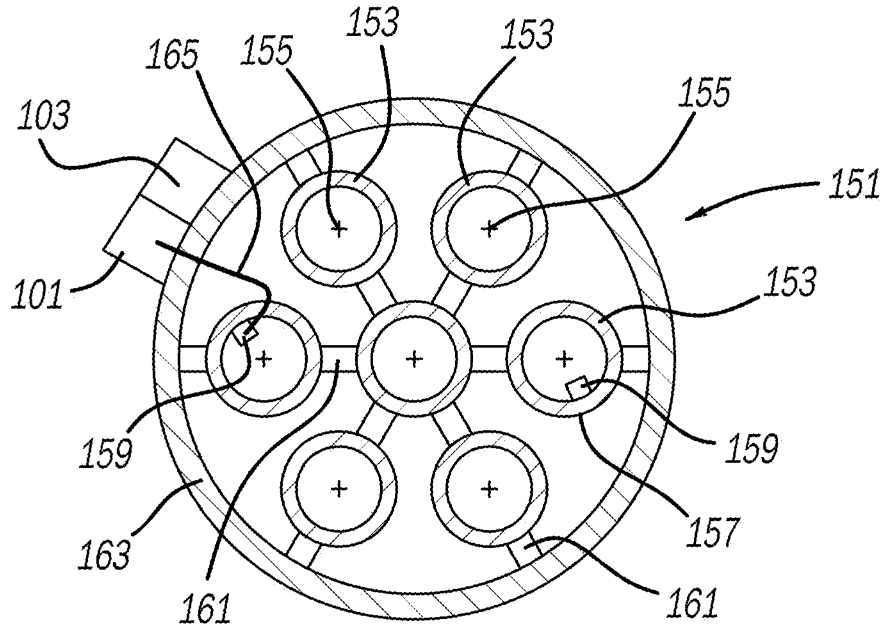
FIG. 4 is a cross-sectional view showing a first pre-assembled group of storage tanks of the present system.

A first preassembled group 151 of multiple distribution or end use tanks 153 can be observed in FIG. 4. Each tank has an elongated centerline 155 extending through a hollow hydrogen fuel storage cavity, and all of the tank centerlines are approximately parallel to each other. Preferably, each tank 153 includes a single metallic vessel wall 157 to which are volume, pressure, temperature, contamination and environmental sensors 159 like in the previous embodiments discussed hereinabove. Each tank 153 further includes inlets and outlets, and associated automatically controllable valves. The tanks are preferably stainless steel or aluminum but may alternately be made from a composite such as one including a polymeric material with carbon fiber, fiberglass, Kevlar, spectra or the like. The tanks may or may not be cryogenically cooled, and if so, preferably as a preassembled group of tanks with a single cooling system or alternately, individually cooled.

Structural metal spars or brackets 161 extend between outer surfaces of tanks 153 and are welded or otherwise fastened thereto. This arrangement spaces apart each tank 153 from its neighbors. In this configuration, the spars and tanks are located in an outwardly radiating pattern, with a majority of the tanks laterally outboard of a centrally located tank, when viewed from their ends.

A single and generally circularly curved, insulator jacket 163 surrounds all of the tanks of this preassembled group. Insulator jacket 163 is preferably made from a metallic material such as stainless steel but may alternately be made from a composite material such as one containing a polymer plus fiberglass or carbon fiber. A vacuum negative pressure is pulled from a port in jacket 163. Spars 161 laterally space the outermost of the tanks inwardly away from an internal surface of insulator jacket 163 so the vacuum therebetween reduces heat transfer between the tanks and the jacket.

Preassembled tank group 151 preferably contains a single microprocessor 101 with an associated transmitter/receiver 103 mounted to an exterior of insulator jacket 163 or a surrounding housing. Microprocessor 101 is connected to sensors 159 and valves of all of the tanks therein, however, each tank may alternately have its own microprocessor and transmitter/receiver associated therewith. Wires 165 connecting sensors 159 to microprocessor 101 extend through a sealed hole in insulator jacket 163.

Figure 5:
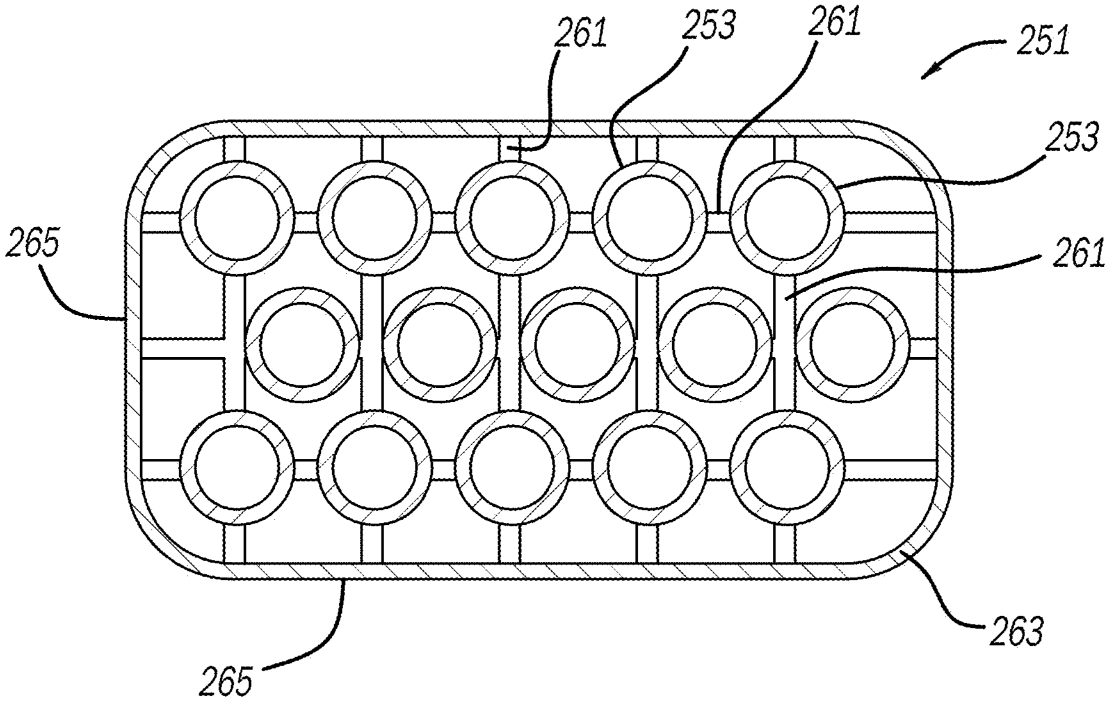
FIG. 5 is a cross-sectional view showing a second pre-assembled group of storage tanks of the present system.

FIG. 5 illustrates another preassembled group 251 of hydrogen storage tanks 253. Struts or brackets 261 connect together the tanks in a spaced apart manner, but in a parallel and offset layered row arrangement. A single vacuum insulator jacket 263 surrounds the entire group of tanks 253 and has a somewhat rectangular polygonal shape with flat exterior faces 265 intersecting at rounded corners. The sensors, microprocessor, communications transmitter/receiver, ports and valves are similar to the previous embodiments.

Figure 6:
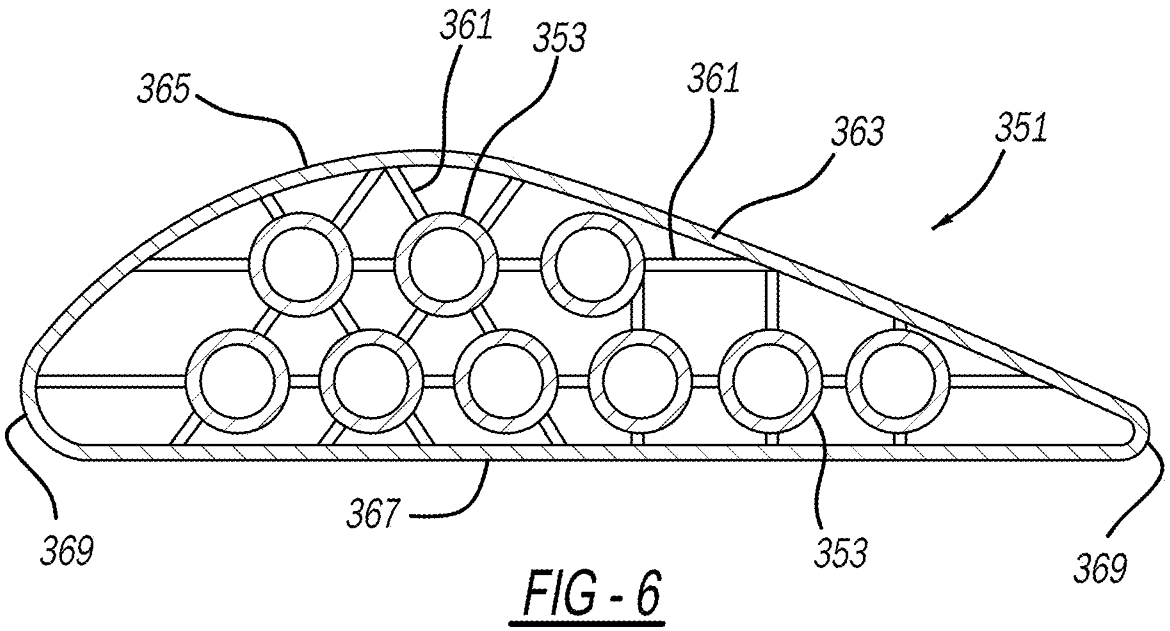
FIG. 6 is a cross-sectional view showing a third pre-assembled group of storage tanks of the present system.

Referring now to FIG. 6, a third preassembled group 351 of hydrogen storage tanks 353 is arranged in offset and generally parallel rows with spars 361 spanning between the tanks. A surrounding vacuum insulator jacket 363 has an airfoil exterior shape, with a gently curving upper surface 365, a generally flat or larger radius lower surface 367, and tighter radius leading and trailing surfaces 369. Thus, this group is well suited for placement inside an airplane wing, control surfaces or fuselage. The sensors, microprocessor, communications transmitter/receiver, ports and valves are similar to the previous embodiments.

Figure 7:
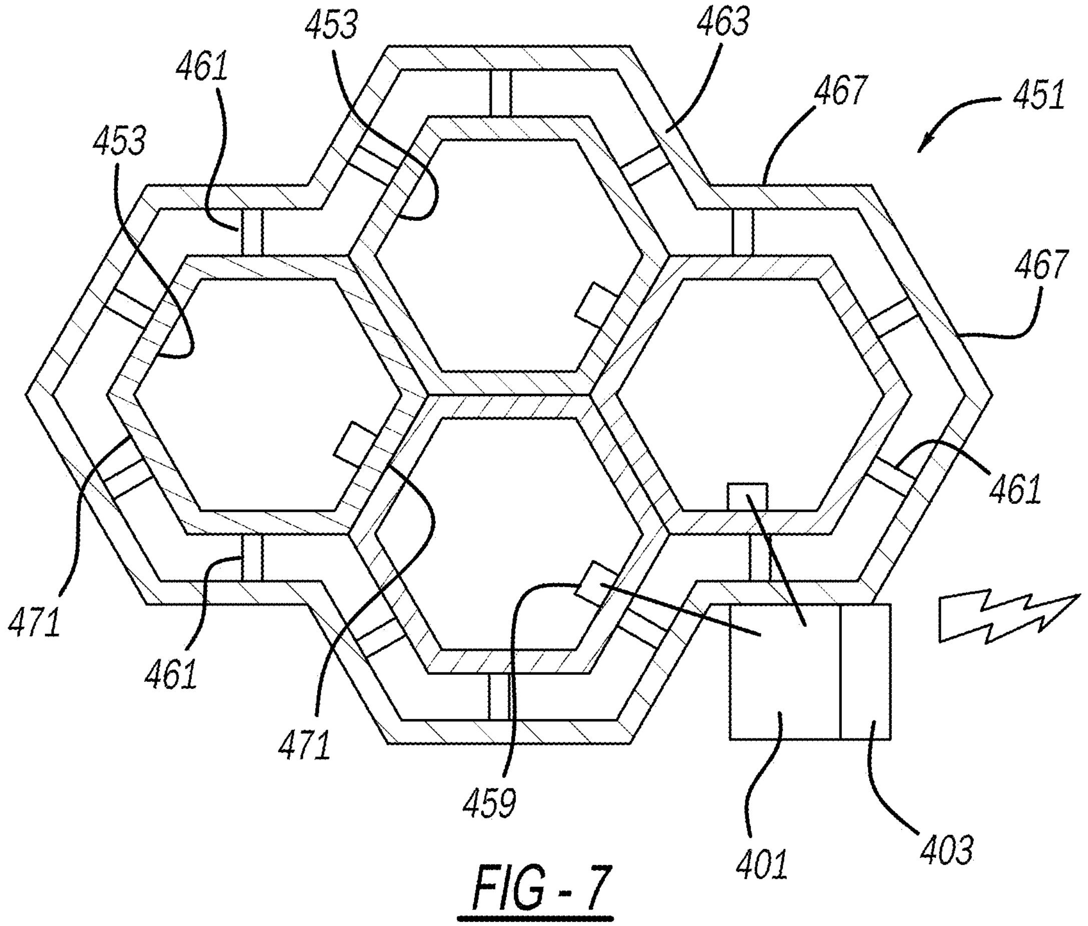
FIG. 7 is a cross-sectional view showing a fourth pre-assembled group of storage tanks of the present system.

A fourth embodiment is shown in FIG. 7. A fourth preassembled group 451 of hydrogen storage tanks 453 is arranged in offset and generally parallel rows. No spars are needed with this arrangement since flat exterior faces 471 of the tanks are in directly attached contact with each other in a honeycomb-like end view pattern. The tanks may be welded, riveted, bolted or adhesively bonded together, with or without insulator pads directly sandwiched therebetween. A surrounding vacuum insulator jacket 463, with flat or curved exterior faces 467 surrounds this group of tanks 453 with an air gap and supporting spars 461 therebetween. Sensors 459, a microprocessor 401, a communications transmitter/receiver 403, ports and valves are similar to the previous embodiments.

Figure 8:
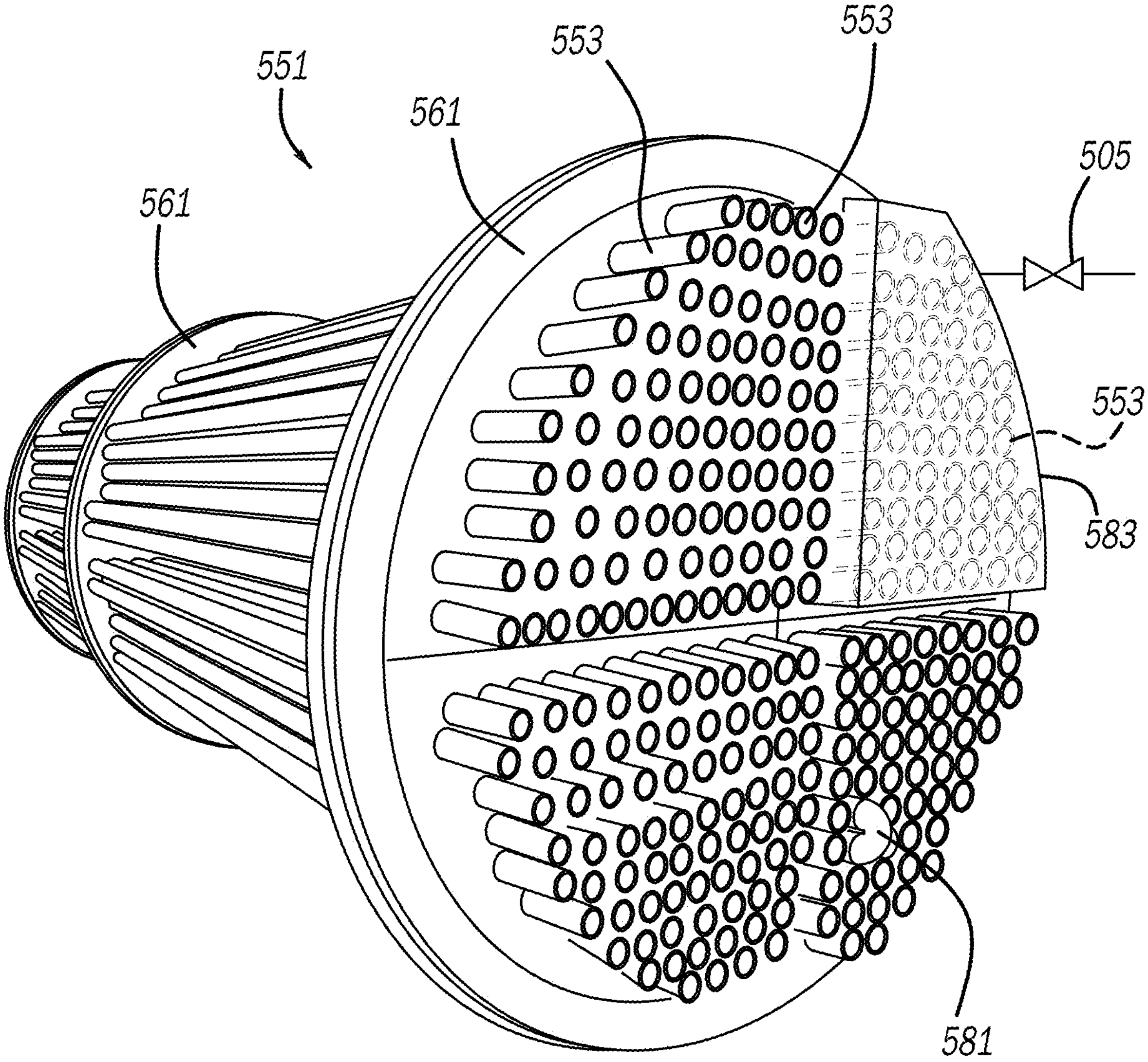
FIG. 8 is a perspective view showing a fifth pre-assembled group of storage tanks of the present system.

FIG. 8 shows a fifth preassembled group 551 of hydrogen storage tanks 553 arranged in generally parallel horizontal rows and vertical columns with laterally extending retention plates 561 spanning between the tanks. Alternatively, this tank can be formed from a long single tube bending in coil or bundle shapes. Connections can be made in one or both end(s) of that tube coil or bundle. A surrounding insulator vacuum jacket may optionally be employed to surround all of the tanks in a generally circular manner. Each tank 553 is a longitudinally elongated tube with a length to diameter ratio of 4:1 to 250:1. Each end may have curved elbows 581 to fluidically connect adjacent of the tubular tanks 553 and/or can attach to manifolds 583 via T or Y fittings. The manifolds internally contain fluid passageways which are connected to a master inlet/outlet shut-off control valve 505 which can be automatically operated by a local microprocessor or remotely from the central controller. Thus, this construction is easier and less expensive to manufacture and assembly than more traditional tanks, and also can store higher pressure hydrogen fuel therein withstanding higher pressure cycles and extended fatigue life. The sensors, microprocessor, communications transmitter/receiver, ports and other valves are similar to the previous embodiments.

Referring to FIGS. 1, 9, and 11-13, remote, central computer controller 51 includes an output display screen 601, an input mouse or keyboard 603, in addition to internal RAM or ROM memory 605, a power supply 607, microprocessor 101 and communications transmitter/receiver 103. Software instructions, stored in memory 605 and operated by microprocessor 101, receive digital signals sent by sensors 85, 87, 88, 89, 91 through the tank-mounted transmitter 103. In approximately real-time, central controller 51 automatically compares the actual sensed tank/fuel signals to threshold values, pre-stored in memory 605, and then automatically determines if an undesired tank, fuel or external condition exists. If an undesired condition exists then central controller 51 automatically sends a signal, such as a text message, e-mail message or warning message, to a handheld or remote cellular telephone, pager or other portable communicator 609 and/or portable computer carried by a field technician user. The message may warn of an urgent and hazardous situation, or schedule routine maintenance or replacement of a tank, valve, actuator, cooling hardware, sensor or associated component. The power supply may be a fuel cell using some of the hydrogen stored in the associated tank, a photovoltaic panel, a wind turbine or less preferably, electricity from a power grid.

Exemplary and non-limiting tank and/or fuel characteristic sensors include at least one of: pressure sensor 85, fuel volume sensor 87, temperature sensor 88, leak sensor 89, a contaminant sensor 90, a humidity sensor, and a vacuum sensor. Additionally, environmental sensor 93 is externally mounted to the insulator jacket, if present, and if not, to the outside of the tank, such as on a hardware component attached thereto. The environmental sensor monitors if a hazardous external characteristic is present such as a nearby flame, excessive heat due to sunlight, excessive heat due to a nearby engine exhaust outlet, excessive heat due to a forest fire, an exposed electrical arc, or the like. If fire is detected by the sensor, the tank is automatically put into a safe mode by the local microprocessor mounted to the tank and/or the remote controller automatically causing the actuator to close the tank's main shut-off valve to isolate the hydrogen therein. Additionally, the other sensors monitor the tank temperature and pressure to determine if the hydrogen should be automatically vented to a safe location such as a connected vent stack, outside the distribution vehicle or another facility located away from people. The pressure relief valve will open at a pre-set pressure, in a default condition which is below the maximum allowable tank pressure, and the hydrogen will be automatically vented to a safe location even if the local or remote microprocessors are offline.

Contaminant sensor 90 automatically senses and reports undesired carbon monoxide, hydrogen sulfide, siloxane, water, turbidity or other undesired gas, liquid or solid particles in the hydrogen fuel. Carbon monoxide, hydrogen sulfide and siloxane may occur when water is split to create hydrogen in a fuel cell. A further example employs a hydrometer to sense water corrected to hydrogen cross-sensitivity. Water contamination is undesirable since it can freeze when hydrogen expands as it travels through heat exchanger pipes and valves, and it may also corrode the steel tanks and plumbing. For example, an exemplary carbon monoxide sensor is an electro-chemical sensor corrected to hydrogen cross-sensitivity to detect carbon monoxide gas in low ppm levels, of the type that can be obtained from Aphasense Inc. of Essex, UK or Membrapor AG of Wallisellen, Switzerland. As another example, exemplary hydrogen sulfide and siloxane sensors are mass spectrometers or gas chromatographs, of the type that can be obtained from Crowcon Detection Instruments Ltd. of Oxfordshire, UK. These contamination sensors are located inside the tank and either continuously or periodically measure contaminants in the fuel; these automatically operated sensors of the present system advantageously are more cost effective to operate and without the need for external accessibility as compared to traditional manual purity checks by a person who must travel to the site and open the tank.

Leak sensor 89 is located on the outside of the associated tank or a hardware component attached thereto, such as the manifold. If hydrogen gas is automatically detected by leak sensor 89 outside the tank then it is presumed to be a leak from the tank and the tank is automatically put into a safe mode by the local microprocessor mounted to the tank and/or the remote controller, automatically causing the actuator to close the tank's isolation valves. In the case of the cryo-compressed tank, the isolation valve is inside the insulated vacuum jacket. An exemplary leak sensor can be obtained from Nissha FIS, Inc. of Kyoto, Japan, and an exemplary pressure relief valve can be obtained from Fluid Mechanics Valve Co. of Houston, Texas.

For stationary, underground tank 29, an integrated vacuum pressure sensor 621 is coupled to the vacuum insulator jacket surrounding the underground tank. This sensor 621 continuously senses and detects a vacuum pressure characteristic within the jacket in real-time, and then automatically sends a sensing output signal to local microprocessor 101, which in turn, transmits the pressure data to remote central controller 51 if the vacuum pressure increases (i.e., the vacuum is failing) relative to a desired threshold value. If a small vacuum leak is determined by the controller then it will automatically cause an external vacuum pump coupled to the underground tank assembly to compensate by periodically applying a greater negative pressure. But if a larger vacuum leak is determined by the controller then it will automatically send a message or alert to a technician for repair or replacement.

Pressure sensor 89 and/or volume sensor 87 for each tank can be automatically monitored by local microprocessor 101 and/or central controller 51 to determine if the tank's pressure is about to be exceeded (in which event filling will be automatically stopped), has been exceeded relative to the tank's desired pressure rating (in which event the excess will be automatically vented), or to automatically log and determine the quantity of refills. The local or central microprocessor will send a maintenance or replacement message to a field technician if the quantity of refills exceeds a predetermined threshold so the tank can be scheduled for structural testing and/or replacement. This may be desirable if the tank has a fatigue load and cyclic load limit. Alternately, the processor can automatically reduce subsequent fill and storage quantities and pressures within a tank if it determines that an actual quantity of full filling cycles has exceeded the desired quantity, thereby prolonging the useful life of the tank.

Figure 10:
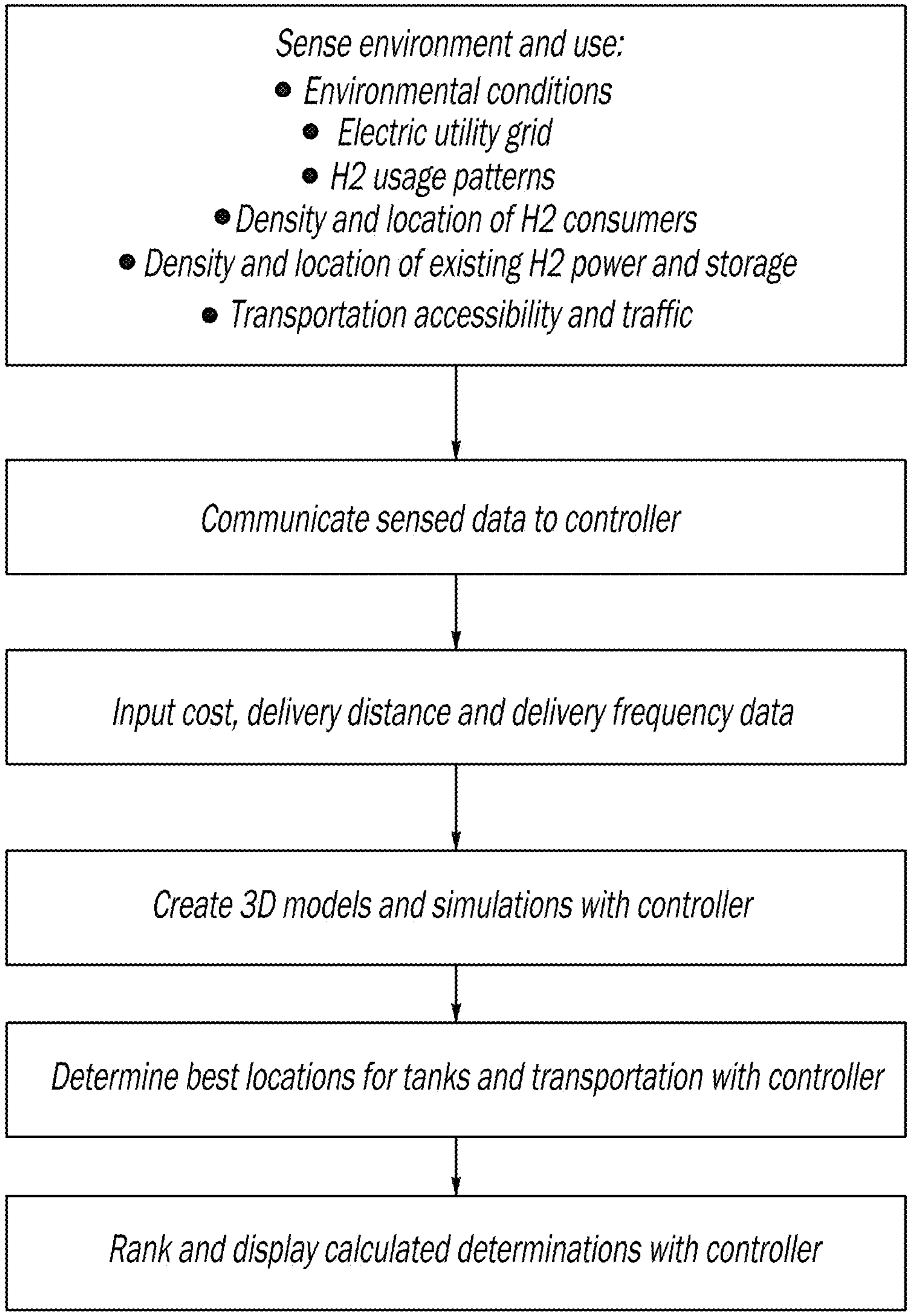
FIGS. 10-13 are logic flow diagrams for software used in the present system.
Figure 11:
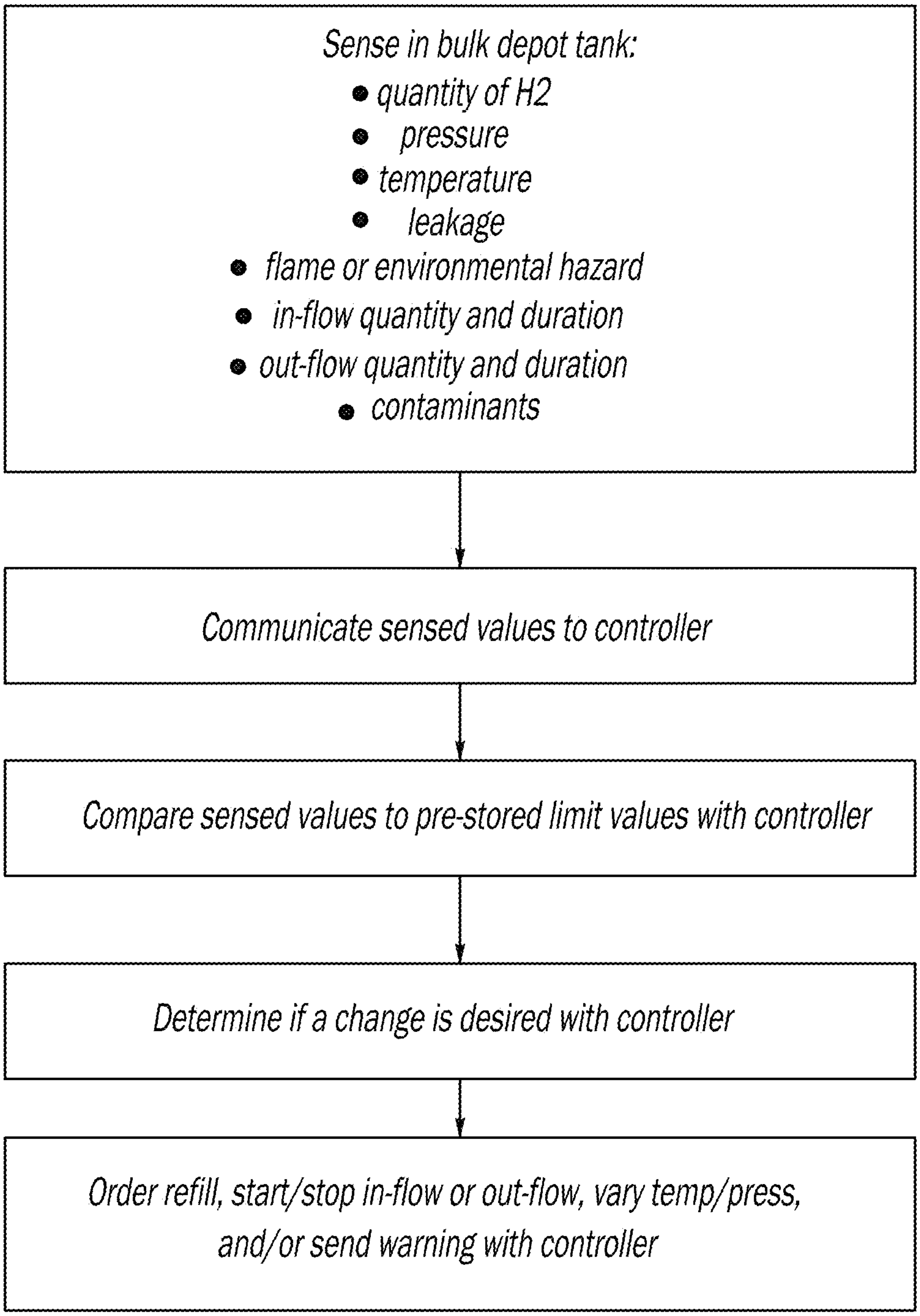
Figure 12:
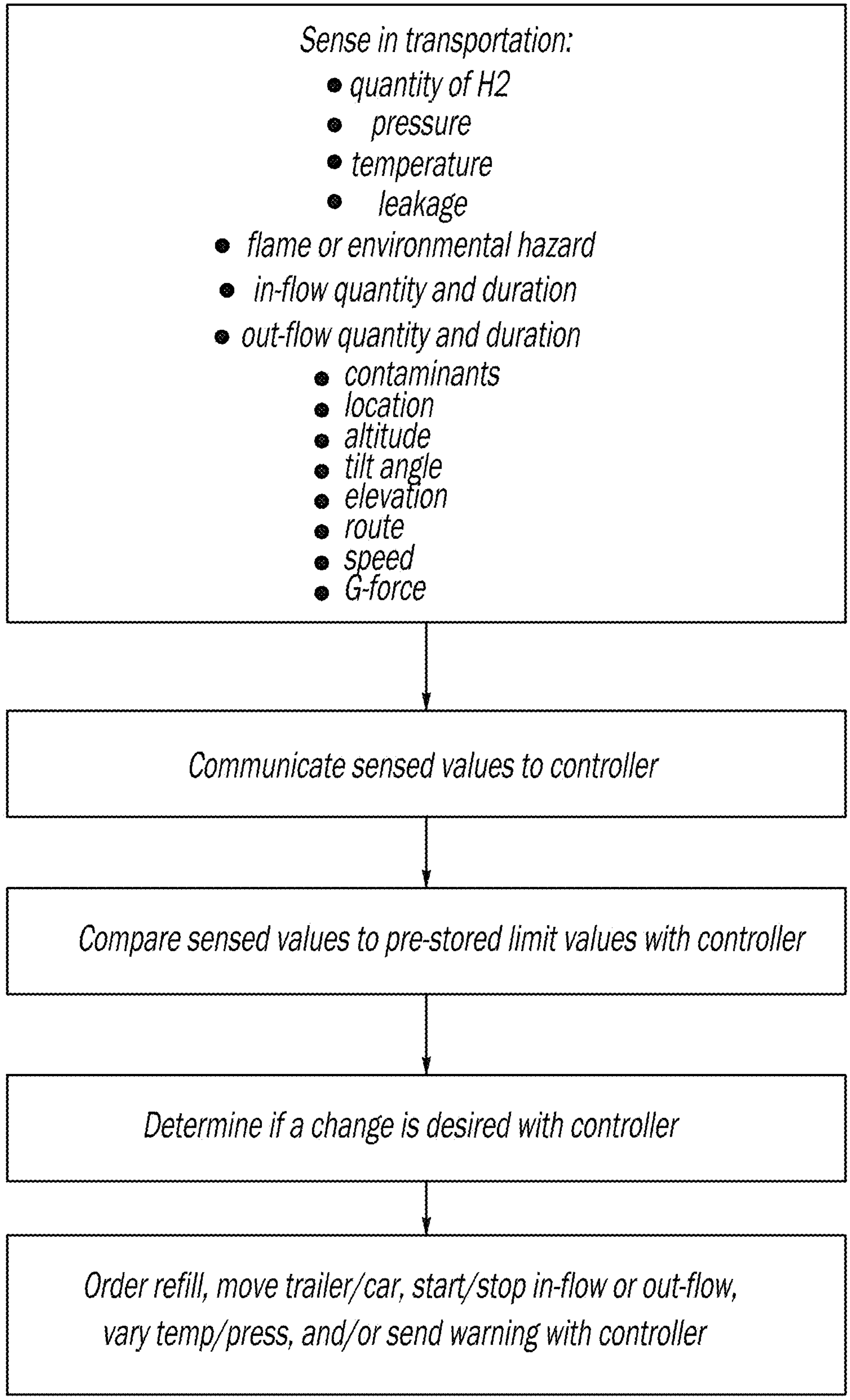
Figure 13:
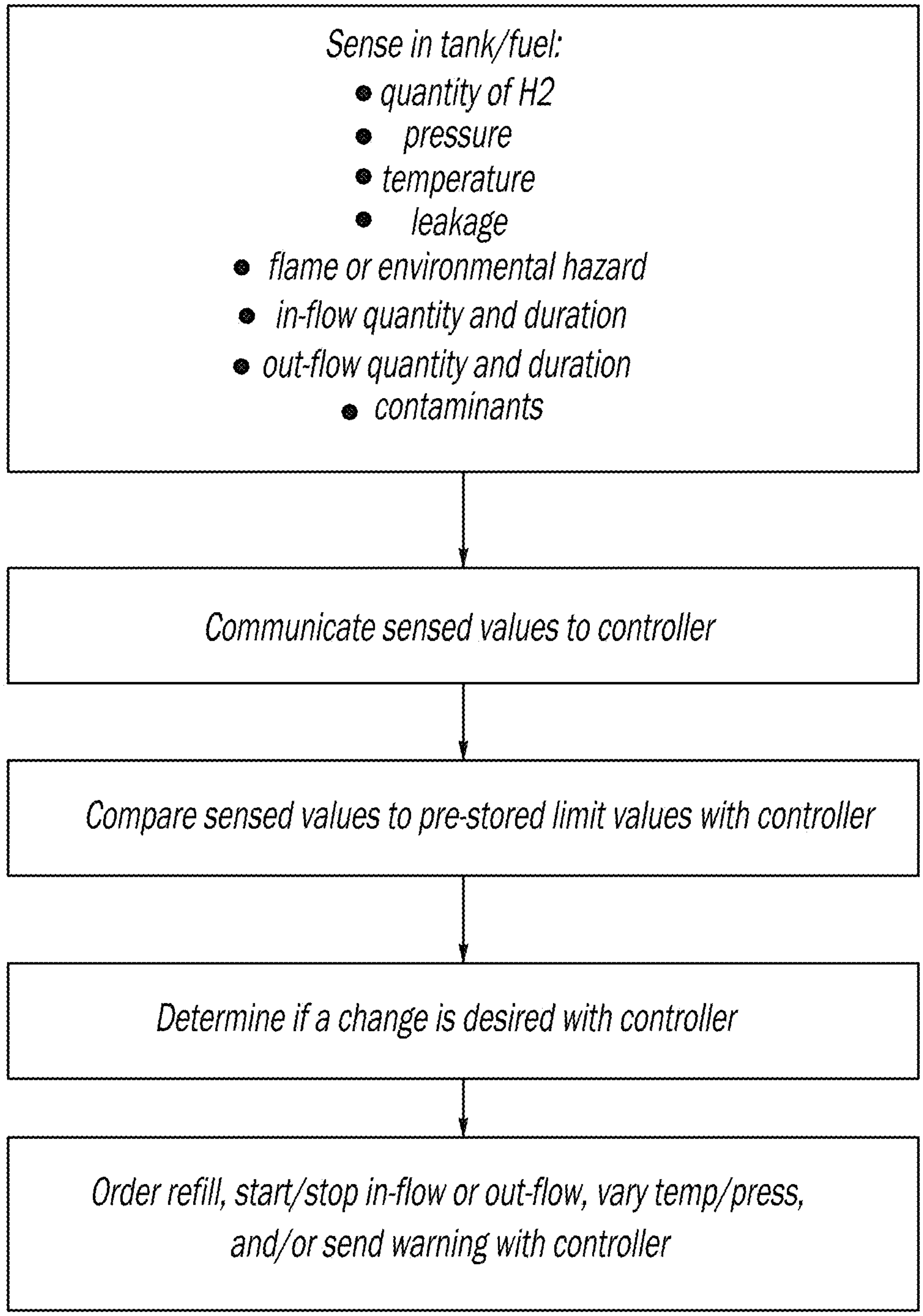

FIGS. 1, 9, and 10 depict a predictive analytics method for remote, central computer controller 51. Software instructions, stored in non-transient memory 605 and operated by microprocessor 101, receive digital signals sent by sensors 85, 87, 88, 89, 91 through the tank-mounted transmitters 103. Location modules include a satellite-based global positioning system or cellular telephone triangulation electronics for sending signals to the central controller indicative of a portable tank's location. For the distribution vehicles and associated distribution tanks, one or more of the controllers will optionally automatically receive sensor signals indicative of transportation altitude, tilt angle, elevation, route, speed and G-forces, for the controller's automatic use in autonomous driving and tracking. Additionally, the software instructions and controller receive environmental condition data such as actual and predicted weather information including temperatures, humidity, wind speed and direction, forest fires, snow and ice, and associated trends. The software instructions and controller also receive past and predicted electric utility grid usage data, hydrogen usage data, natural gas usage data, and associated trends. Furthermore, the software instructions and controller receive past and predicted quantity, density and change data pertaining to energy consumer population, industrial building, residential building, office building, hospitals and vehicles. Moreover, the software instructions and controller receive past and predicted quantity, density and change data pertaining to hydrogen power usage, storage and capacity. The software instructions and controller receive past and predicted quantity, density and change data pertaining to transportation accessibility (e.g., roads), depots and traffic patterns for distribution vehicles.

The central controller and its software inputs fuel cost, fuel delivery distance and fuel delivery frequency data for the relevant geographical region. Then the controller and its software automatically creates three-dimensional virtual models and maps which it uses to automatically determine most efficient and least expensive locations for bulk storage tanks, distribution tanks and depot hubs, and temporary stocking of end use storage tanks. The controller and its software automatically creates three-dimensional virtual models and maps which it uses to automatically determine most efficient and least expensive distribution vehicle use (e.g., land vehicle, aircraft, watercraft, rail), routes and scheduling times between the storage tanks. Additionally, the controller and its software automatically determines most efficient and least expensive refilling timing and advance reordering of the fuel between the tanks. Moreover, the controller and its software automatically determine most efficient and least expensive timing for maintenance and replacement of the fuel storage tanks. All of these modelled determinations are visually displayed and ranked based on different optimization criterion (e.g., cost, use priority, weather, vehicle availability and scheduling, maintenance manpower availability, etc.) if a supervisory employee desires to manually check and or vary the determinations before the controller automatically transmits signals to move the distribution vehicles and control tank outflow/inflow for fuel filling. The supervisory employee can also use the modelled determinations to set up new distribution depots.

The present system and method can be used to provide hydrogen fuel to generators for charging batteries in electric vehicles. They can also be used to provide hydrogen fuel for emergency roadside fueling stations in remote areas for hydrogen powered vehicles. Furthermore, the present system and method may be used to provide hydrogen fuel to electricity generators or fuel cells to provide temporary electrical power to aircraft or watercraft while they wait at boarding gates or docks. The present system is well suited for providing hydrogen fuel to primary or backup electrical generators or fuel cells used to power residential, office, commercial, industrial or hospital buildings. Optionally, a tank assembly will have its own power supply, either from a fuel cell (using hydrogen from the tank), a battery, a receptacle for an external power source, or a combination of these arrangements. This power is used for all electric systems that are part of the tank assembly. On the other hand, the hydrogen is supplied to the electricity generator (which is a fuel cell) from the tank for stationary end-use cases such as aircraft on the ground, a watercraft in a harbor, a building, a data center, etc. Generally, the aircraft and watercraft will be connected to a ground power unit ("GPU") which will be a fuel cell generator on a cart or trailer, and the present tank system can be an integral part of a GPU or just supply hydrogen to the GPU-integrated tank. For the building, data center and other facility applications, there may or may not be any GPU. Moreover, the fuel cell generator can be housed inside or outside the building or facility, and the present tank system will supply hydrogen to those fuel cell generators to power the facilities continuously or as a backup, as needed.

While various features of the present invention have been disclosed, it should be appreciated that other variations may be employed. For example, different shapes and sizes of the tanks can be employed, although various advantages of the present system may not be realized. As another example, alternate fuel fluids can be stored in the tanks discussed hereinabove, such as propane, liquefied natural gas, ammonia, carbon dioxide, oxygen, methane, landfill bio-gas, or the like, but certain benefits may not be obtained. Additionally, alternate sensor constructions and locations can be employed although durability, performance, and cost may not be as beneficial as the preferred examples. Moreover, additional or different electrical components may be incorporated in the electrical circuit of the present system, such that solid state electronics and digital processors can be substituted for each other. While a single central controller has been described, this function can be divided among multiple controllers that are remotely located away from the storage tanks; for example, the predictive modeling can be performed by a different computer controller than the one used for actual fuel sensing and filling control. Features of each of the embodiments and uses may be interchanged and replaced with similar features of other embodiments, and all of the claims may be multiply dependent on each other in any combination. Variations are not to be regarded as a departure from the present disclosure, and all such modifications are intended to be included within the scope and spirit of the present invention.

The invention claimed is:

1. A method of distributing hydrogen fuel comprising:

(a) automatically sensing characteristics associated with a portable distribution hydrogen storage tank carried by a distribution vehicle;

(b) automatically sensing characteristics associated with a stationary end use hydrogen storage tank;

(c) receiving real-time signals by a programmable controller based on the sensed characteristics;

(d) using the controller to automatically change a condition of a valve coupled to at least one of the tanks, based on at least one of the sensed characteristics;

(e) the controller receiving data pertaining to usage, storage and capacity of the hydrogen fuel in the distribution and end use tanks, which the controller automatically uses to schedule future distribution of additional hydrogen fuel; and (f) using the hydrogen fuel from the end use tank, which is stationary, to provide temporary electrical power from a ground-based generator to an aircraft while the aircraft waits.

2. The method of claim 1, further comprising the controller automatically determining timing for maintenance and replacement of the distribution and end use tanks, the end use tanks being at an airport for use in providing the temporary electrical power to multiples of the aircraft, the end use tanks including a corrosion inhibiting coating, and a sensor and a microprocessor being locally coupled to at least one of the end use tanks.

3. The method of claim 1, further comprising the controller automatically sensing characteristics associated with a stationary bulk hydrogen storage tank.

4. The method of claim 1, further comprising providing the hydrogen fuel from the end use tank, which is below ground, to the generator which is a fuel cell generator.

5. The method of claim 1, further comprising connecting the generator, which is a ground power unit, powered by the end use tank, to an aircraft, mounting the controller and the transmitter to an insulator surrounding the end use tank, and mounting sensors within the insulator.

6. The method of claim 1, further comprising automatically scheduling and determining a distribution route for the distribution vehicle which is autonomously driven.

7. The method of claim 1, further comprising:

(a) automatically sensing a characteristic including: environmental hazards, temperature, pressure, and filled volume, associated with a stationary bulk hydrogen storage tank;

(b) automatically sensing a characteristic including: environmental hazards, temperature, pressure, and filled volume, associated with the portable distribution hydrogen storage tank carried by the vehicle;

(c) automatically sensing a characteristic including: environmental hazards, temperature, pressure, and filled volume, associated with the stationary end use hydrogen storage tank;

(d) automatically sending a signal to the controller based on the sensed characteristic associated with at least one of: the stationary bulk storage tank, the portable distribution tank and the stationary end use storage tank; and (e) the controller automatically changing distribution of the hydrogen fuel, based on the sensed characteristic.

8. The method of claim 1, further comprising the controller automatically causing refilling of the end use storage tank, which is located below-ground, with the hydrogen fuel, and the aircraft being located adjacent a boarding gate when the electrical power is being supplied to the aircraft.

9. The method of claim 1, further comprising the controller automatically stopping filling of the hydrogen fuel to or from the end use storage tank, which is located below-ground, and the aircraft being located adjacent a boarding gate when the electrical power is being supplied to the aircraft.

10. The method of claim 1, further comprising the controller automatically causing distribution of multiples of the portable distribution hydrogen storage tank from stockpiled regional depots, based on at least one of: automatically sensed use, population growth, power outage or emergency needs.

11. The method of claim 1, further comprising sending a signal from a flame or heat sensor coupled to an outside of at least one of the tanks, to the controller.

12. The method of claim 1, further comprising:

at least one of: the distribution tank or the end use tank, comprises a preassembled group of elongated tanks with each having parallel centerlines and a sensor coupled to each of the elongated tanks of the preassembled group;

automatically controlling valves associated with each of the elongated tanks of the preassembled group;

surrounding the preassembled group with an insulator jacket; and each of the elongated tanks of the preassembled group having flat exterior faces which are directly attached to adjacent of the elongated tanks to create a honeycomb end view pattern.

13. A method of distributing hydrogen fuel comprising:

(a) automatically sensing characteristics associated with a portable distribution hydrogen storage tank carried by a distribution vehicle;

(b) automatically sensing characteristics associated with a stationary end use hydrogen storage tank;

(c) receiving real-time signals by a programmable controller based on the sensed characteristics;

(d) using the controller to automatically change a condition of a valve coupled to at least one of the tanks, based on at least one of the sensed characteristics;

(e) the controller receiving data pertaining to usage, storage and capacity of the hydrogen fuel in the distribution and end use tanks, which the controller automatically uses to schedule future distribution of additional hydrogen fuel;

(f) using the hydrogen fuel from the end use tank to provide temporary electrical power to an aircraft while it waits; and (g) sending a signal from a hydrometer sensor coupled to at least one of the tanks, to the controller.

14. A method of distributing hydrogen fuel comprising:

(a) automatically sensing characteristics associated with a portable distribution hydrogen storage tank carried by a distribution vehicle;

(b) automatically sensing characteristics associated with a stationary end use hydrogen storage tank;

(c) receiving real-time signals by a programmable controller based on the sensed characteristics;

(d) using the controller to automatically change a condition of a valve coupled to at least one of the tanks, based on at least one of the sensed characteristics;

(e) the controller receiving data pertaining to usage, storage and capacity of the hydrogen fuel in the distribution and end use tanks, which the controller automatically uses to schedule future distribution of additional hydrogen fuel;

(f) using the hydrogen fuel from the end use tank to provide temporary electrical power to an aircraft while it waits; and (g) sending a sensed signal of at least one of: altitude, tilt angle, speed or G-forces, of the distribution tank, to the controller.

15. The method of claim 14, further comprising the controller receiving data pertaining to usage, storage and capacity of the hydrogen fuel in the bulk, distribution and end use tanks, which the controller automatically uses to schedule future distribution of additional hydrogen fuel.

16. The method of claim 14, further comprising:

at least one of: the distribution tank or the end use tank, comprises a preassembled group of elongated tanks with each having parallel centerlines and a sensor coupled to each of the elongated tanks of the preassembled group;

automatically controlling valves associated with each of the elongated tanks of the preassembled group;

transmitting a valve control signal from the controller to a microprocessor mounted to the preassembled group;

cooling the elongated tanks of the preassembled group; and securing together outer surfaces of the elongated tanks of the preassembled group.

17. The method of claim 14, further comprising:

at least one of: the distribution tank or the end use tank, comprises a preassembled group of elongated tanks with each having parallel centerlines and a sensor coupled to each of the elongated tanks of the preassembled group;

automatically controlling valves associated with each of the elongated tanks of the preassembled group;

securing together the elongated tanks of the preassembled group with structural spars or brackets extending between outer surfaces thereof in order to space apart the elongated tanks from each other; and surrounding the preassembled group with an insulator jacket.

18. A method of distributing hydrogen fuel comprising:

(a) automatically sensing characteristics associated with portable distribution hydrogen storage tanks carried by distribution vehicles;

(b) automatically sensing characteristics associated with stationary end use hydrogen storage tanks;

(c) receiving signals by at least one programmable controller based on the sensed characteristics;

(d) the at least one controller receiving data pertaining to usage, storage and capacity of the hydrogen fuel in the distribution and end use tanks, which the controller automatically uses to schedule future distribution of additional hydrogen fuel;

(e) connecting the aircraft to a ground power unit comprising an electricity generator or a fuel cell generator on a cart or trailer;

(f) providing the hydrogen fuel from at least one of the end use tanks to a fuel cell or an electricity generator of the ground power unit;

(g) providing temporary electrical power to an aircraft while it waits, adjacent to a boarding gate, from the generator; and (h) using software instructions stored in non-transient memory and operating in the at least one controller, the software instructions comprising:

instructions receiving real-time sensed tank and fuel data regarding the portable distribution hydrogen storage tanks;

instructions receiving real-time sensed tank, fuel and environmental data regarding the end use tanks;

instructions automatically determining a filled quantity of the fuel within each of the distribution and end use tanks; and instructions automatically causing at least one of the distribution tanks to refill at least one of the end use tanks.

19. The method of claim 18, further comprising the controller automatically determining timing for maintenance and replacement of the distribution and end use tanks.

20. The method of claim 18, further comprising the controller automatically sensing characteristics associated with a stationary bulk hydrogen storage tank.

21. The method of claim 18, further comprising automatically scheduling and determining a distribution route for the distribution vehicle which is autonomously driven.

22. The method of claim 18, further comprising sending a signal from a flame or heat sensor coupled to an outside of at least one of the tanks, to the at least one controller.

23. The method of claim 18, further comprising sending a signal from a hydrometer sensor coupled to an outside of at least one of the tanks, to the at least one controller.

24. A method of distributing hydrogen fuel comprising:

(a) automatically sensing characteristics associated with portable distribution hydrogen storage tanks carried by distribution vehicles;

(b) automatically sensing characteristics associated with stationary end use hydrogen storage tanks;

(c) receiving signals by at least one programmable controller based on the sensed characteristics;

(d) the at least one controller receiving data pertaining to usage, storage and capacity of the hydrogen fuel in the distribution and end use tanks, which the controller automatically uses to schedule future distribution of additional hydrogen fuel;

(e) connecting the aircraft to a ground power unit comprising an electricity generator or a fuel cell generator on a cart or trailer;

(f) providing the hydrogen fuel from at least one of the end use tanks to a fuel cell or an electricity generator; and (g) providing temporary electrical power to an aircraft while it waits, from the generator; and (h) sending a sensed signal of at least one of: altitude, tilt angle, speed or G-forces, of the distribution tank, to the at least one controller.

25. The method of claim 24, further comprising the at least one controller receiving data pertaining to usage, storage and capacity of the hydrogen fuel in the bulk, distribution and end use tanks, which the at least one controller automatically uses to schedule future distribution of additional hydrogen fuel.

26. The method of claim 24, further comprising the at least one controller automatically stopping filling of the hydrogen fuel to or from the end use storage tank, which is located below-ground.

27. The method of claim 24, further comprising software instructions stored in non-transient memory and operating in the controller, the software instructions comprising:

(a) a set of instructions receiving real-time sensed tank, fuel and environmental data regarding the portable distribution hydrogen storage tanks;

(b) a set of instructions receiving real-time sensed tank, fuel and environmental data regarding the stationary end use hydrogen storage tanks;

(c) a set of instructions automatically determining a filled quantity of the fuel within each of the distribution and end use tanks;

(d) a set of instructions automatically causing at least one of the distribution tanks to refill at least one of the end use storage tanks;

(e) a set of instructions automatically sending a signal to the at least one controller, which is a remote controller, if an environmental hazard is sensed;

(f) a set of instructions automatically changing a characteristic associated with at least one of the storage tanks based on at least some of the sensed data received; and (g) a set of instructions causing the hydrogen fuel to be used from at least one of the end use tanks to provide the temporary electrical power to the aircraft while on the ground.

28. Aircraft hydrogen fuel storage and delivery software, stored in non-transient memory, comprising:

(a) instructions receiving real-time sensed tank, hydrogen fuel and environmental data regarding stationary bulk hydrogen storage tanks;

(b) instructions receiving real-time sensed tank, hydrogen fuel and positioning data regarding portable distribution hydrogen storage tanks;

(c) instructions receiving real-time sensed tank, hydrogen fuel and environmental data regarding stationary end use hydrogen storage tanks;

(d) instructions automatically determining a filled quantity of the hydrogen fuel within each of the distribution tanks and each of the end use storage tanks;

(e) instructions automatically causing at least one of the distribution tanks to be refilled from at least one of the bulk storage tanks;

(f) instructions automatically causing at least one of the distribution tanks to refill at least one of the end use storage tanks;

(g) instructions automatically sending a signal to a remote controller if an environmental hazard is sensed;

(h) instructions automatically changing a characteristic associated with at least one of the storage tanks or hydrogen fuel therein based on at least some of the sensed data received;

(i) a set of instructions causing the hydrogen fuel to be used from at least one of the end use tanks to provide temporary electrical power to an aircraft while on the ground;

(j) instructions comparing actual hydrogen fuel consumption and tank refill data to desired thresholds; and (k) instructions automatically predictively modeling at least one of: new production facilities, new production locations, new production capacities, or new distribution depot locations for at least some of the distribution tanks.

29. The software of claim 28, wherein the automatically predictively modeling includes the new distribution depot locations for at least some of the distribution tanks.

30. The software of claim 28, further comprising additional instructions automatically causing an autonomously driven aircraft to move at least one of the distribution tanks from at least one of the bulk storage tanks to at least one of the end use tanks.

31. The software of claim 28, further comprising additional instructions determining if the hydrogen fuel is contaminated based on at least some of the sensed data.

32. The software of claim 28, further comprising additional instructions determining if a quantity of refilling cycles of at least one of the tanks has exceeded a desired threshold based on at least some of the sensed data.

33. The software of claim 28, further comprising automatically stopping filling of the hydrogen fuel to or from the end use storage tank, which is located below-ground.

* * * * *